United States Patent [19]

Giovanetti

[11] Patent Number: 5,060,973
[45] Date of Patent: Oct. 29, 1991

[54] LIQUID PROPELLANT INFLATOR FOR VEHICLE OCCUPANT RESTRAINT APPARATUS

[75] Inventor: Anthony J. Giovanetti, Lenox, Mass.

[73] Assignee: General Electric Company, Pittsfield, Mass.

[21] Appl. No.: 556,226

[22] Filed: Jul. 23, 1990

[51] Int. Cl.⁵ .............................................. B60R 21/26
[52] U.S. Cl. ................................... 280/736; 280/741; 102/530; 102/705; 149/45; 149/92
[58] Field of Search ............... 280/728, 736, 737, 740, 280/741, 742; 222/3; 149/46, 58, 59, 92; 60/205, 217, 218; 102/530, 531, 478, 705

[56] References Cited

U.S. PATENT DOCUMENTS

| | | | |
|---|---|---|---|
| 3,618,974 | 9/1971 | Chute | 280/741 |
| 3,689,105 | 9/1972 | Matsui et al. | 280/737 |
| 3,774,150 | 11/1973 | Matsui et al. | 280/741 X |
| 3,781,788 | 12/1973 | Schiesterl et al. | 280/728 X |
| 3,797,853 | 3/1974 | Grosch et al. | 280/740 |
| 3,817,263 | 6/1974 | Bendler et al. | 280/736 X |
| 3,862,866 | 1/1975 | Timmerman et al. | 280/741 |
| 3,897,285 | 7/1975 | Hamilton et al. | 149/41 |
| 3,901,747 | 8/1975 | Garner | 149/42 |
| 3,904,221 | 9/1975 | Shiki et al. | 280/736 |
| 3,912,562 | 10/1975 | Garner | 149/41 |
| 3,920,575 | 11/1975 | Shiki et al. | 280/728 X |
| 3,985,375 | 10/1976 | Lewis et al. | 280/737 |
| 4,006,919 | 2/1977 | Neuman | 280/736 |
| 4,214,438 | 7/1980 | Hamilton et al. | 60/205 |
| 4,238,253 | 12/1980 | Garner | 149/19.6 |
| 4,244,758 | 1/1981 | Garner et al. | 149/7 |
| 4,527,389 | 7/1985 | Biddle et al. | 60/207 |
| 4,734,141 | 3/1988 | Cartwright et al. | 280/736 |
| 4,758,287 | 7/1988 | Pietz | 149/2 |
| 4,878,968 | 11/1989 | Willer et al. | 149/45 |
| 4,899,663 | 2/1990 | Thorn | 102/530 |
| 4,948,439 | 8/1990 | Poole et al. | 280/736 |
| 5,014,623 | 5/1991 | Walker et al. | 102/477 |

FOREIGN PATENT DOCUMENTS

| | | | |
|---|---|---|---|
| 2119927 | 11/1971 | Fed. Rep. of Germany | 280/737 |
| 2119928 | 11/1971 | Fed. Rep. of Germany | 280/737 |
| 2112006 | 8/1977 | Fed. Rep. of Germany | 280/737 |

Primary Examiner—Charles A. Marmor
Assistant Examiner—Tamara L. Finlay
Attorney, Agent, or Firm—Bailin L. Kuch; Robert A. Cahill

[57] ABSTRACT

To deploy an inflatable member, such as an occupant restraint safety bag in a motor vehicle, a liquid propellant is expelled from a storage reservoir into a reaction chamber through ports created at frangible pressure points in the reservoir wall and ignited by detonation of an explosive charge to generate a non-toxic, bag inflating gas by exothermic reaction.

19 Claims, 1 Drawing Sheet

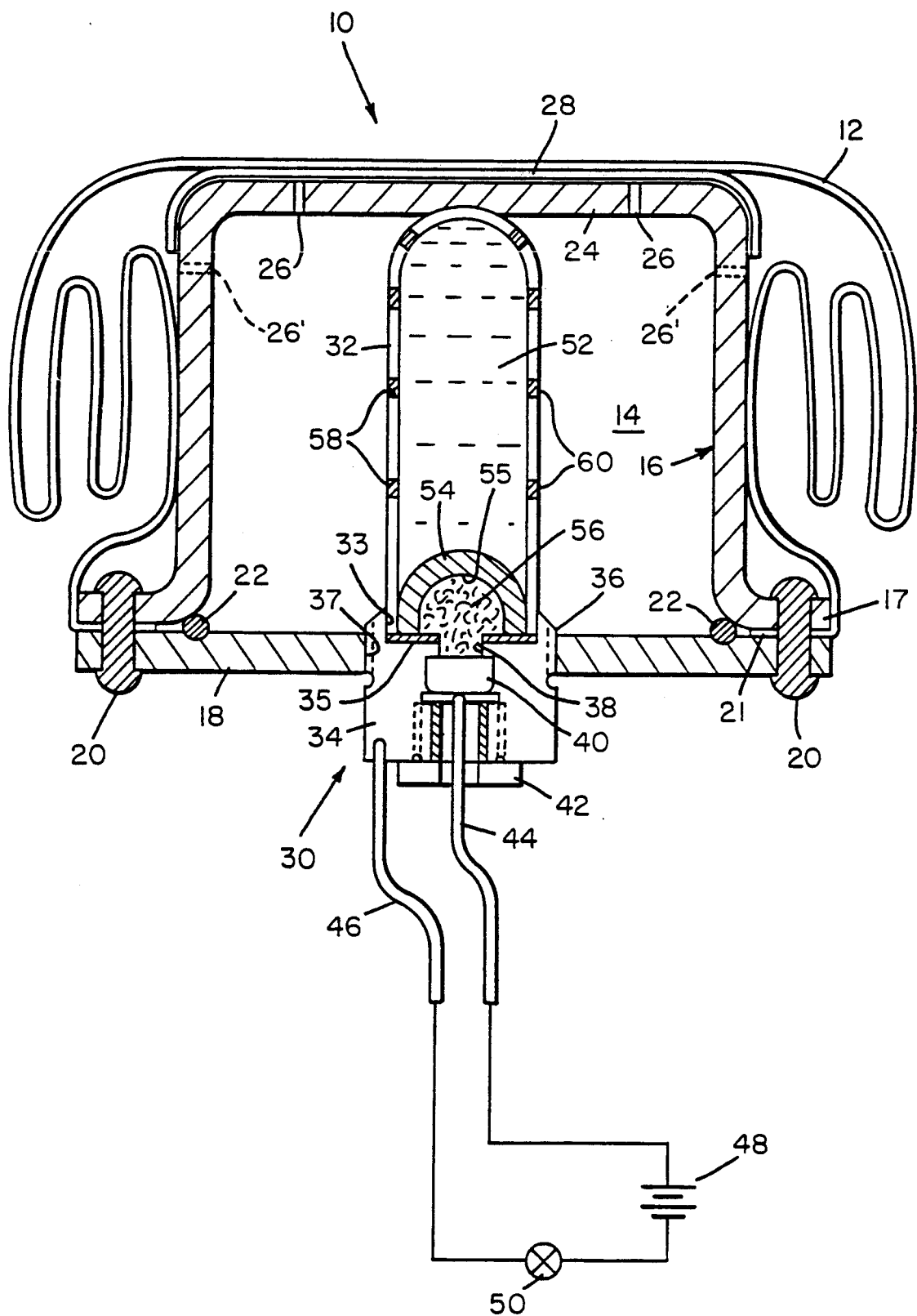

LIQUID PROPELLANT INFLATOR FOR VEHICLE OCCUPANT RESTRAINT APPARATUS

The present invention relates to safety apparatus and particularly to passive restraint apparatus utilizing an inflatable safety bag for preventing serious injury to an occupant of a motor vehicle involved in an accident.

BACKGROUND OF THE INVENTION

"Passive" restraint apparatus which requires no action by a vehicle occupant to make operative, as contrasted to "active" restraint apparatus requiring a conscious effort by an occupant to become operative (such as conventional seat belts) are more commonly being installed in motor vehicles as the result of government agency, insurance industry and consumer pressures. Experience and testing have shown that the most effective passive occupant restraint approach is to abruptly (in a matter of milliseconds) inflate a safety bag automatically in response to a sudden change in vehicle velocity occasioned by a high impact accident. The inflated safety bag pins the occupant in his/her seat, well cushioned from the effects of the accident for an interval sufficient to prevent serious injury.

The mechanics for timely safety bag inflation are basically of two types. One type involves storing a liquidfied gas under high pressure in a reservoir. On impact, the liquidfied gas is allowed to escape and convert to its gaseous form, inflating the safety bag. The approach has numerous disadvantages. The bulk and weight of the components for handling the gas-producing liquid makes it difficult and expensive to package the safety apparatus in the steering columns and dashboards of the motor vehicles. Storage integrity over a long time period of widely varying ambient conditions is tenuous at best. Moreover, the most effective and practical gas-producing liquids are chlorofluorocarbons, such as FREON, which have adverse effects on the environment.

As a consequence, safety bag inflation through the release of liquidfied gas has largely been supplanted by the use of ignitable propellants capable of rapidly generating large volumes of gas by exothermic reaction. Heretofore, the propellants have invariably been in a solid or granular form comprised of low energy compositions, such as an alkalai metal azide, cupric oxide, boron nitrate, etc. The solid propellants need not be stored under pressure, are stable over time and varying ambient conditions, and are convenient to package in a passive restraint apparatus. There is however a significant drawback to the use of solid propellants of this type, in that the generated gas contains toxic by-products and particulate matter. As a consequence, the safety bag inflating gases must first be filtered to remove the toxic by-products and also to catch combusting particulate matter which is capable of burning holes in the safety bag. These filters increase the size, weight and cost of a passive restraint apparatus.

It is accordingly an object of the present invention to provide an improved apparatus for exothermically generating large volumes of gas to deploy an inflatable member.

A further object is to provide apparatus of the above-character for abruptly inflating an occupant restraint safety bag in a motor vehicle.

An additional object is to provide occupant restraint apparatus of the above-character, wherein the generated gas is inherently free of potentially harmful by-products.

Another object is to provide occupant restraint apparatus of the above-character, which is simple in construction, light weight, compact, and reliable in operation.

Other objects of the invention will in part be obvious and in part appear hereinafter.

SUMMARY OF THE INVENTION

In accordance with the present invention, there is provided a passive restraint apparatus for motor vehicles, which includes a safety bag that is inflated at the moment of impact incident with a vehicular accident to protect an occupant against injury. Safety bag inflation is achieved by the rapid generation of gases in an exothermic reaction involving a combustible propellant. In accordance with a signal feature of the present invention, the combustible propellant is a liquid propellant, disclosed herein as a monopropellant, rather than a solid propellant as has heretofore been the case.

The liquid propellant is stored in a hermetically sealed reservoir disposed in a reaction chamber sealed in the mouth of a collapsed safety bag. In the event of a high impact vehicular accident, a small explosive booster charge is detonated to pressurize the liquid propellant which is forced out into the reaction chamber through ports in the reservoir wall normally blocked by frangible seals. The liquid propellant in the reaction chamber is ignited in a controlled manner by the combusting booster charge to rapidly generate by exothermic reaction a large volume of gas which flows through openings in the reaction chamber wall to inflate the safety bag.

The invention accordingly comprises the features of construction, combination of elements and arrangement of parts, all as described hereinbelow, and the scope of the invention will be indicated in the appended claims.

For a full understanding of the nature and objects of the invention, reference may be had to the sole FIGURE of the drawing, which is a sectional view of an occupant restraint apparatus constructed in accordance with an embodiment of the invention.

DETAILED DESCRIPTION

Referring to the sole drawing FIGURE, the occupant restraint apparatus of the present invention is seen to include an inflator, generally indicated at 10, for inflating a safety bag 12, shown in its collapsed condition. The inflator includes a reaction chamber 14 defined by an inverted, pan-shaped vessel 16 and an end cap 18. The lower, marginal portion of the vessel sidewall is turned outwardly to provide a circular flange 17 against which the end cap is secured by a series of rivets 20. To seal the inflator to the safety bag, a marginal portion 21 of the bag material surrounding the bag opening or mouth is clamped between the vessel flange and the end cap. The bag material is conventional, e.g., neoprene or silicone coated nylon. The vessel and end cap material may be an alloy steel of sufficient thickness to withstand pressures of at least 10 KPSI. An annular fluid seal 22 may be lodged in place fronting the junction of the vessel and end cap to ensure against fluid leakage. To provide fluid communication with the bag interior, the vessel endwall 24 is provided with a circular of array of passages; two of an exemplary total of eight passages being seen at 26. These passages are normally covered by a heat shield 28 lightly adhered to the outer surface of endwall 24.

Installed to the vessel-end cap assembly is a propellant-detonator module, generally indicated at 30, which includes a tubular reservoir 32 affixed at its open end in a recess 33 provided in the upper end of a plug 34 by suitable means, such as a swage and weld joint. A gasket 35 may be incorporated in this joint as a fluid seal. The plug is threaded at 36 for module installation in a central, threaded opening 37 in end cap 18. The plug is also provided with a central through-bore 38 which is counterbored for receipt of an electrical primer 40 and threaded to accept a plug 42 introducing one electrode 44 to the primer. Another electrode 46 is electrically terminated in the body of this plug. The electrodes are wired to the vehicle battery 48 through a normally open, impact sensitive, inertial switch 50.

Stored within reservoir 32 is a quantity of liquid propellant 52, such as a hydroxyl ammonium nitrate-based liquid monopropellant. Slidingly received in the reservoir at its lower end is a dome-shaped piston or plunger 54 which provides, with the end of plug bore 38 above the primer 40, a cavity 55 for containing a booster charge 56 capable of being detonated by the primer upon closure of switch 50. The booster charge may consist of, for example, smokeless powder, liquid propellant, etc. The electrical primer 40 may take various well-known forms, such as an exploding bridge-wire or a electrically conducting chemical mixture, such as lead styphnate and the like.

To inflate the safety bag 12 at the moment of a high impact accident sensed by switch 50, primer 40 detonates booster charge 56, and plunger 54 is driven upwardly to pressurize liquid propellant 52 in reservoir 32. As a result, the liquid propellant is forced out into the reaction chamber 14 through a plurality of ports 58 in the reservoir wall, which are normally sealed by rupturable plugs 60. These plugs may consist of an RTV silicone sealant, for example. Preferably, the plugs are created by machining frangible pressure points in the reservoir wall that are ruptured by the pressurized liquid propellant to create ports 58. It will be noted that these ports are distributed along the length of the tubular reservoir, and thus the liquid propellant in the reaction chamber 14 is exposed to the combusting booster charge material in a controlled manner as plunger 54 is driven upwardly, through the length of the reservoir, past successive ports. Since it is the combusting booster charge material entering the reaction chamber through the ports as they are uncovered by the plunger that ignites the liquid propellant, controlled ignition of the liquid propellant in the reaction chamber is achieved. The resulting exothermic reaction generates a rapidly increasing volume of gas which exits the reaction chamber through the vessel openings 26 to inflate the safety bag 12. The heat shield 28, which is blown away from the vessel by the bag-inflating gas to uncover openings 26, serves to protect the safety bag from possible damage during initial inflation due to direct exposure to the high gas temperatures.

Preferably, the plunger 54 is dome-shaped to conform to the closed upper end of the reservoir 32 to ensure that all of the liquid propellant is forced out of the reservoir when the plunger reaches the end of its stroke. This construction precludes liquid propellant ignition within the reservoir. Additionally, the reservoir closed end is abutted against the underside of the vessel endwall 24 during assembly of the module 30 to prevent rupturing the reservoir-plug joint during the safety bag inflation process.

While the openings 26 are shown located in vessel endwall 24, it will be appreciated that they may be located in the vessel sidewall, as indicated in phantom at 26'. In this case, the heat shield 28 would be made to extend over these sidewall openings to protect the safety bag during initial inflation.

The use of a liquid propellant to inflate an occupant restraint safety bag has several distinct advantages over solid propellants. In the case of a liquid propellant such as an aqueous solution of hydroxyl ammonium nitrate and a nitrated hydrocarbon salt, such as triethanol ammonium nitrate, the exothermically generated gases consist of nitrogen, carbon dioxide and water vapor, which are non-toxic. Furthermore, there is no particulate by-product of the liquid propellant combustion. Consequently, filtering of the bag-inflating gas is unnecessary. A liquid propellant such as hydroxyl ammonium nitrate and triethanol ammonium nitrate has a higher energy density than state-of-the-art solid propellants, thereby allowing for reductions in propellant charge. The net result in utilizing liquid propellant in accordance with the present invention is a safer passive occupant restraint apparatus of reduced size, weight and complexity. A particularly suitable liquid propellant composition would comprise, by mass, approximately 60% hydroxyl ammonium nitrate as an oxidizer, 20% triethanol ammonium nitrate as a fuel, and 20% water as a solvent. Hydroxyl ammonium nitrate, by itself, is a poor propellant, and its combustion products are not clean.

While the present invention has been disclosed in its application of inflating the safety bag of an occupant restraint apparatus, it will be understood that the teachings disclosed herein may be applied to other applications calling for the rapid, controlled deployment of an inflatable member.

It is seen that objects set forth above, including those made apparent from the foregoing Detailed Description, are efficiently attained, and since certain changes may be made in the construction set forth without departing from the present invention, it is intended that all matters of detail be taken as illustrative and not in a limiting sense.

Having described the invention, what is claimed as new and desired to secure by Letters Patent is:

1. Apparatus for deploying an inflatable member comprising, in combination:
   A. a reaction chamber connected in fluid flow communication with the inflatable member;
   B. a reservoir disposed within said reaction chamber, said reservoir having a plurality of ports communicating with said reaction chamber and pressure sensitive sealing means normally closing said ports;
   C. a quantity of liquid propellant stored in said reservoir; and
   D. means for pressurizing said liquid propellant to open said sealing means and to expel said liquid propellant from said reservoir into said reaction chamber through said ports and for igniting said liquid propellant only after entry into said reaction chamber, thereby generating gas by exothermic reaction to inflate the inflatable member.

2. The apparatus defined in claim 1, wherein said liquid propellant pressurizing and igniting means includes a plunger disposed adjacent one end of said reservoir and an explosive charge, said plunger being driven away from said one reservoir end to expel said liquid propellant into said reaction chamber in response to the generation of hot gas by the detonation of said explosive charge, said hot gas entering said reaction chamber through said ports to ignite said liquid propellant.

3. The apparatus defined in claim 2, wherein said reservoir is tubular in shape and having a closed end in opposed relation to said one end, said ports provided at distributed locations along the reservoir length between said closed and one ends of said reservoir.

4. The apparatus defined in claim 3, wherein said liquid propellant is an aqueous solution of hydroxyl ammonium nitrate as an oxidizer and a nitrated hydrocarbon salt as a fuel.

5. Occupant restraint apparatus for a motor vehicle, said apparatus comprising, in combination:
 A. an inflatable safety bag;
 B. a reaction chamber connected in fluid flow communication with said safety bag;
 C. a reservoir disposed in fluid flow relation with said reaction chamber;
 D. a quantity of liquid propellant stored in said reservoir; and
 E. an inflation initiator responsive to a high impact vehicle accident for expelling said liquid propellant from said reservoir into said reaction chamber and igniting said liquid propellant therein to generate by exothermic reaction a large volume of gas for inflating said safety bag, said initiator including means for preventing ignition of said liquid propellant while in said reservoir.

6. The apparatus defined in claim 5, wherein said reservoir includes a plurality of ports normally closed by frangible seals, said initiator acting to rupture said seals, thereby permitting expulsion of said liquid propellant into said reaction chamber through said ports.

7. The apparatus defined in claim 6, wherein said initiator means includes a plunger disposed adjacent one end of said reservoir, said initiator further including an explosive charge, said plunger being driven away from said one reservoir end in response to detonation of said explosive charge to pressurize said liquid propellant in said reservoir and rupture said seals to expel said liquid propellant from said reservoir into said reaction chamber.

8. The apparatus defined in claim 7, wherein said explosive charge is disposed on the opposite side of said plunger from said liquid propellant in said reservoir, said detonated explosive charge generating a hot gas which enters said reaction chamber through said ports to ignite said liquid propellant therein.

9. The apparatus defined in claim 8, wherein said reservoir is tubular in shape and having a closed end in opposed relation to said one end, said ports provided at distributed locations along the reservoir length between said closed and one ends of said reservoir.

10. The apparatus defined in claim 9, wherein the side of said plunger facing said liquid propellant is shaped in conformity with said closed end of said reservoir.

11. The apparatus defined in claim 9, wherein said liquid propellant is a monopropellant comprising an aqueous solution of hydroxyl ammonium nitrate as a oxidizer and triethanol ammonium nitrate as a fuel.

12. The apparatus defined in claim 9, wherein said explosive charge is comprised of a smokeless powder.

13. The apparatus defined in claim 9, wherein said explosive charge is liquid propellant.

14. The apparatus defined in claim 9, wherein said reaction chamber includes passages through which inflating gas flows into the interior of said safety bag, said apparatus further including a heat shield releaseably disposed over said passages to protect said safety bag during initial inflation.

15. The apparatus defined in claim 9, wherein said reaction chamber further includes a central, threaded opening, said reservoir, plunger and explosive charge being pre-assembled with a threaded plug as an initiator module, said plug being threaded in said central opening to assembly said initiator module to said reaction chamber.

16. A method for deploying an inflatable member comprising the steps of:
 A. providing a reaction chamber in fluid flow communication with the inflatable member;
 B. providing a reservoir containing a liquid propellant;
 C. positioning the reservoir within the reaction chamber;
 D. forcing the liquid propellant from the reservoir into the reaction chamber to initiate deployment; and
 E. igniting the liquid propellant solely in the reaction chamber to generate by exothermic reaction a large volume of gas for inflating the inflatable member.

17. The method defined in claim 16, wherein said liquid propellant forcing step includes pressurizing the liquid propellant to rupture the reservoir at discrete pressure points and create a plurality of ports through which the liquid propellant is expelled into the reaction chamber.

18. The method step defined in claim 17, wherein said igniting step includes detonating an explosive charge to generate combusting matter which enters the reaction chamber through the ports to ignite the liquid propellant in a controlled manner.

19. The method defined in claim 18, wherein the detonation of the explosive charge drives a plunger through the reservoir to pressurize the liquid propellant.

* * * * *